(12) United States Patent
Mou et al.

(10) Patent No.: US 10,864,473 B2
(45) Date of Patent: *Dec. 15, 2020

(54) AIR-FILTERING PROTECTION DEVICE

(71) Applicant: Microjet Technology Co., Ltd., Hsinchu (TW)

(72) Inventors: Hao-Jan Mou, Hsinchu (TW);
Chi-Feng Huang, Hsinchu (TW);
Yung-Lung Han, Hsinchu (TW);
Chang-Yen Tsai, Hsinchu (TW);
Wei-Ming Lee, Hsinchu (TW);
Hsuan-Kai Chen, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 158 days.

This patent is subject to a terminal disclaimer.

(21) Appl. No.: 16/036,009

(22) Filed: Jul. 16, 2018

(65) Prior Publication Data
US 2019/0046913 A1    Feb. 14, 2019

(30) Foreign Application Priority Data
Aug. 8, 2017   (TW) ................. 106126732

(51) Int. Cl.
*B01D 46/44*    (2006.01)
*F04B 43/04*    (2006.01)
(Continued)

(52) U.S. Cl.
CPC ........... *B01D 46/442* (2013.01); *A41D 13/11* (2013.01); *A62B 9/006* (2013.01); *A62B 23/025* (2013.01);
(Continued)

(58) Field of Classification Search
CPC ......... A41D 13/11; A62B 18/02; A62B 18/08; A62B 18/006; A62B 23/025; A62B 23/02;
(Continued)

(56) References Cited

U.S. PATENT DOCUMENTS 3,861,381 A * 1/1975 Witman ................ A61M 16/06
128/206.12
6,196,223 B1 * 3/2001 Belfer ................ A41D 13/1176
128/205.25

(Continued)

FOREIGN PATENT DOCUMENTS

CN    103987427 A    8/2014
CN    205538890 U    8/2016

*Primary Examiner* — Timothy A Stanis
*Assistant Examiner* — Nathan M Le
(74) *Attorney, Agent, or Firm* — Birch, Stewart, Kolasch & Birch LLP

(57) ABSTRACT

An air-filtering protection device includes a filtering mask and an actuating and sensing device. The filtering mask is adhered to a user's nose for filter air and includes a first coupling element. The actuating and sensing device includes a second coupling element. The second coupling element is engaged with the first coupling element of the filtering mask for allowing the actuating and sensing device to be detachably mounted on the filtering mask. The actuating and sensing device includes at least one senor, at least one actuating device, a microprocessor, a power controller and a data transceiver. The at least one actuating device is disposed on one side of the at least one sensor and includes at least one guiding channel. The actuating device is enabled to transport an air to flow toward the sensor through the guiding channel so as to make the air sensed by the sensor.

18 Claims, 14 Drawing Sheets

(51) Int. Cl.
*A62B 23/06* (2006.01)
*A41D 13/11* (2006.01)
*A62B 23/02* (2006.01)
*A62B 9/00* (2006.01)

(52) U.S. Cl.
CPC ............ *A62B 23/06* (2013.01); *F04B 43/046* (2013.01); *B01D 2273/30* (2013.01)

(58) Field of Classification Search
CPC .. A62B 7/10; A62B 9/006; B01D 2259/4009; B01D 2259/4541; B01D 53/0454; F04B 43/046; F04B 45/047
See application file for complete search history.

(56) References Cited

U.S. PATENT DOCUMENTS

| | | | | |
|---|---|---|---|---|
| 2003/0205231 | A1* | 11/2003 | Shigematsu | A41D 13/11 128/206.21 |
| 2004/0055605 | A1* | 3/2004 | Griesbach, III | A41D 13/1161 128/206.21 |
| 2005/0056286 | A1* | 3/2005 | Huddart | A61M 16/0688 128/206.21 |
| 2008/0302365 | A1* | 12/2008 | Cohen | A61M 16/06 128/206.12 |
| 2010/0059127 | A1* | 3/2010 | Shibata | F04B 43/046 137/565.11 |
| 2013/0056703 | A1* | 3/2013 | Elian | G01N 27/127 257/9 |
| 2013/0104900 | A1* | 5/2013 | Tobias | A61M 16/105 128/205.12 |
| 2013/0146052 | A1* | 6/2013 | Ding | A62B 9/006 128/202.22 |
| 2013/0239813 | A1* | 9/2013 | Rakow | B01D 46/0086 96/108 |
| 2015/0346174 | A1* | 12/2015 | Beaulieu | G01N 1/2205 128/206.17 |
| 2016/0076530 | A1* | 3/2016 | Chen | F04B 43/046 417/413.2 |
| 2016/0297025 | A1* | 10/2016 | Enyedy | B23K 9/0956 |
| 2017/0028228 | A1* | 2/2017 | Zhao | A62B 18/084 |
| 2017/0080261 | A1* | 3/2017 | Sutton | A62B 7/10 |
| 2017/0106334 | A1* | 4/2017 | Chu | B82Y 30/00 |

* cited by examiner

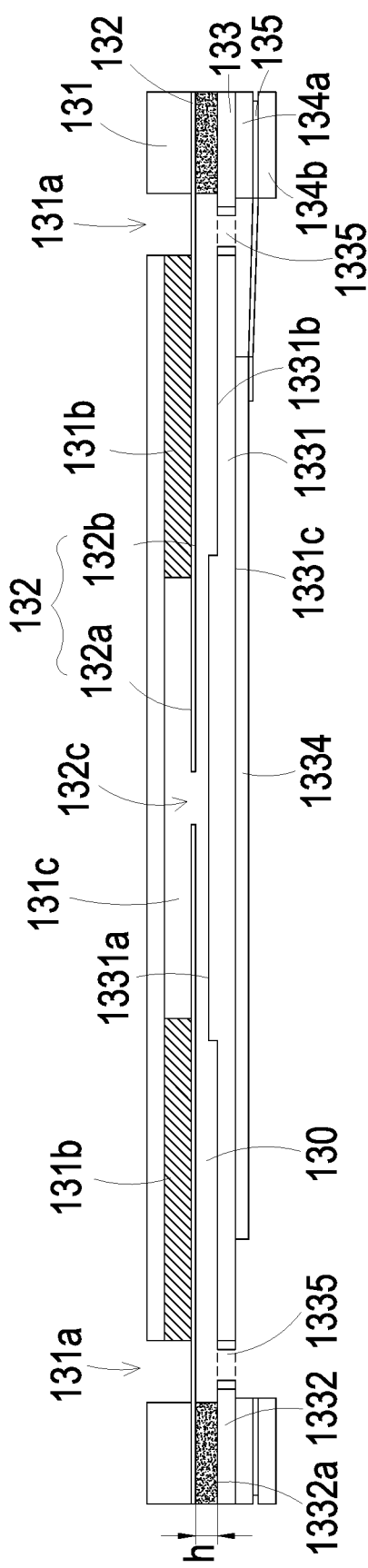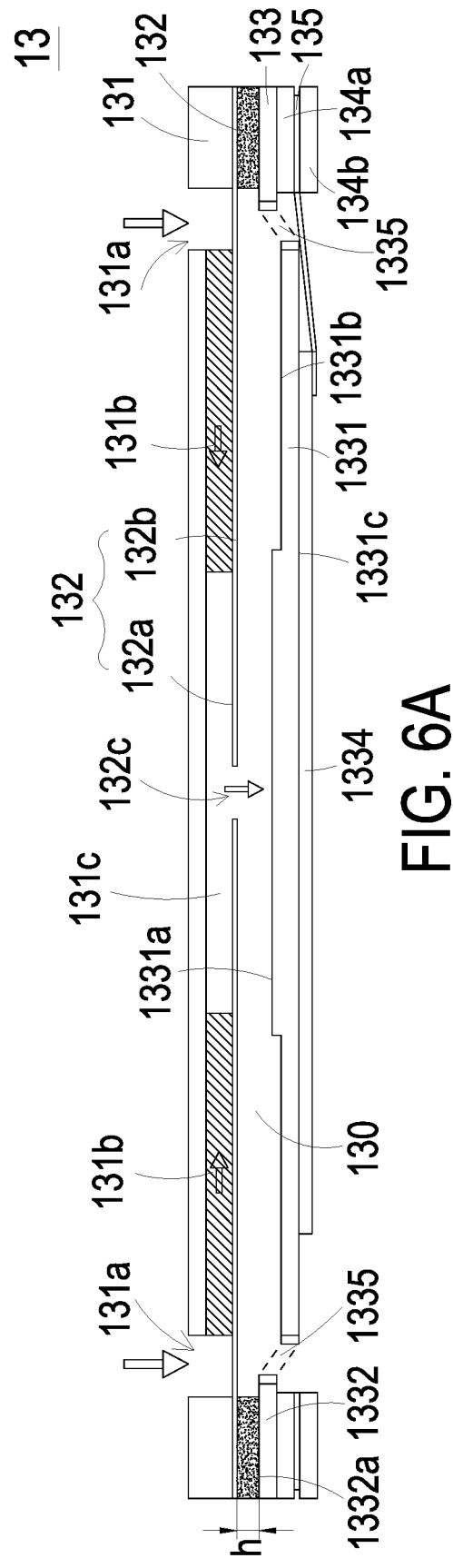

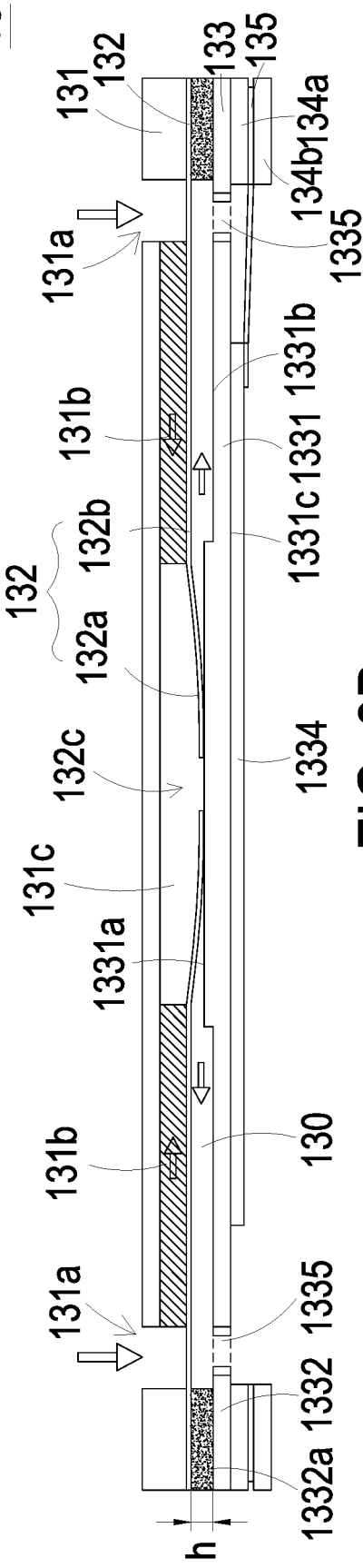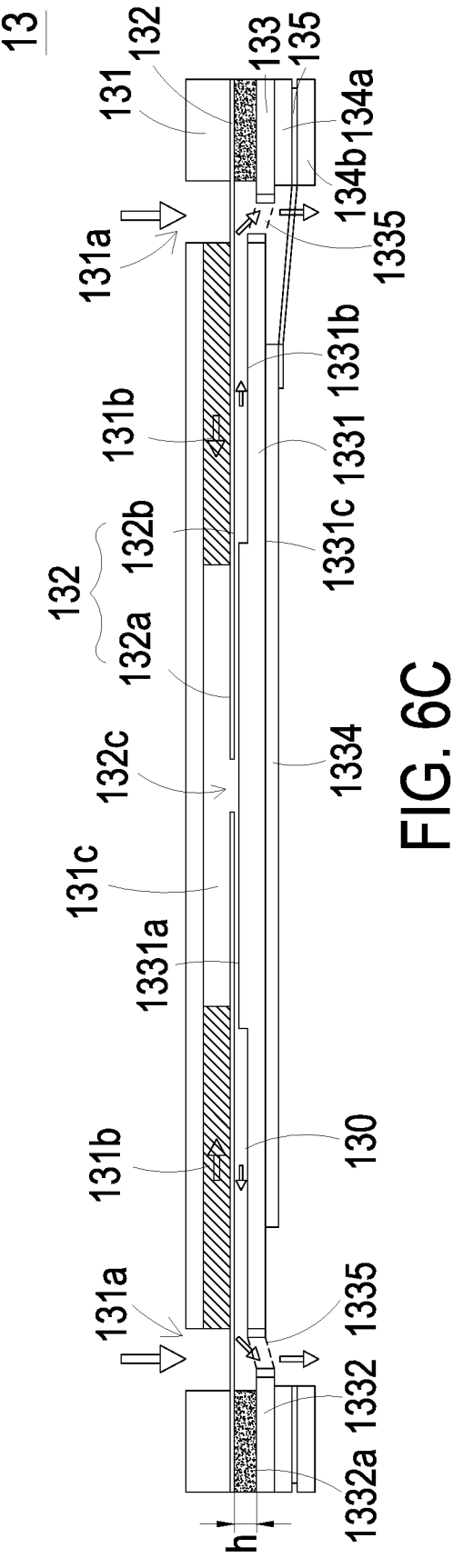

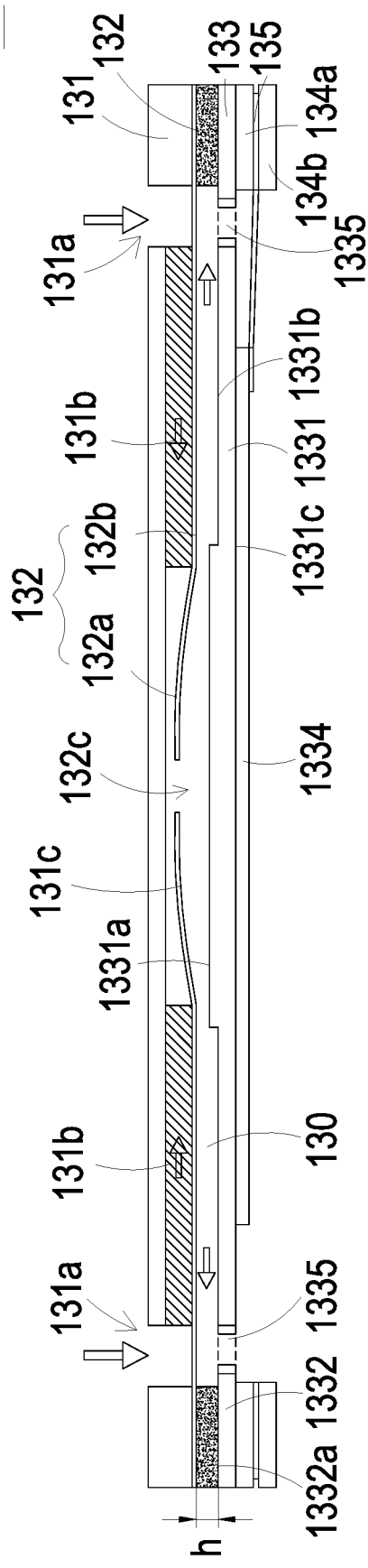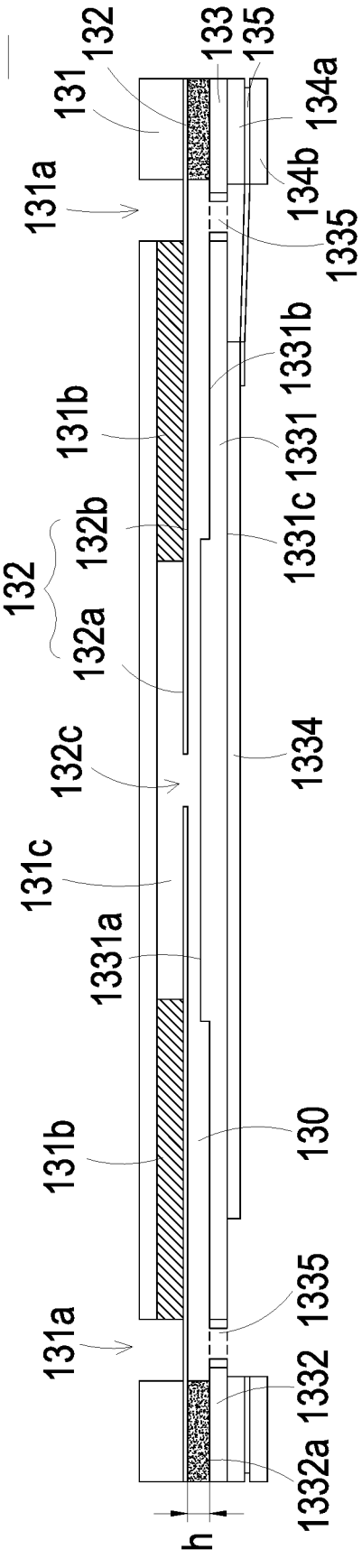

AIR-FILTERING PROTECTION DEVICE

FIELD OF THE INVENTION

The present disclosure relates to an air-filtering protection device, and more particularly to an air-filtering protection device combined with an actuating and sensing device for monitoring the environment.

BACKGROUND OF THE INVENTION

Nowadays, people pay much attention to monitoring environmental air quality in daily living, e.g., monitoring carbon monoxide, carbon dioxide, volatile organic compounds (VOC), PM2.5, and so on. The exposure of these substances in the environment can cause human health problems or can even harm the life. Therefore, it has become an important issue for every country to develop and implement environmental air quality monitoring technology.

As known, portable electronic devices are widely used and applied in the modern lives. In addition, the portable electronic devices are indispensable electronic devices. Accordingly, it is feasible to use the portable electronic device to monitor the ambient air. If the portable electronic device is capable of immediately providing people with the monitored relating to the environment for caution, it may help people escape or prevent from the injury and influence on human health caused by the exposure of the substances described above in the environment. In other words, the portable electronic device is suitably used for monitoring the ambient air in the environment.

Although it is obviously beneficial to make the portable electronic device equipped with environmental sensor for collecting environment data, however, when the environmental sensor is integrated into the electronic device, the monitoring sensitivity and the precision of the environmental sensor should be taken into consideration. For example, the environmental sensor is in contact with the air circulating from the outside and transferred by naturally occurring convection in the surroundings. In other words, the environmental sensor fails to fetch a consistent airflow to maintain stably monitoring. Since it is difficult to trigger response action of the environmental sensor by the circulating air transferred by convection, the response time of the environmental sensor is long and real-time monitoring is not achieved.

As mentioned above, the portable electronic device is suitably used for monitoring the ambient air in the environment. Therefore, there is a need of providing an air-filtering protection device combining with an actuating and sensing device for monitoring the environment and enabling a protection mechanism immediately when the air quality is poor.

SUMMARY OF THE INVENTION

An object of the present disclosure provides an air-filtering protection device combined with an actuating and sensing device for monitoring the environment. When the air-filtering protection device is worn by a user, the mouth and nose of the user is covered and a closed space is formed therebetween. The actuating and sensing device drives the air in the closed space to flow and thereby discharges the air in the closed space. Consequently, the circulation of the air in the closed space is enhanced, and the efficiency of air exchange is improved, so as to improve the efficacy of discharging the polluted air from the closed space and adjusting the temperature and the humidity of the air in the closed space.

Another object of the present disclosure provides an air-filtering protection device combined with an actuating and sensing device for monitoring the environment. Since the air enclosed by the mask is monitored by a sensor of the actuating and sensing device, the air quality monitoring inside the mask is achieved.

A further object of the present invention provides an air-filtering protection device combined with an actuating and sensing device for monitoring the environment. The air circulation in the mask is adjustable according to the condition of the air quality, by driving the air to be discharged in different flow rates (e.g. discharged air volume), so that the air quality inside the mask is regulated. When the sensor continuously detects that the air quality is poor and harmful to human beings continuously, a notification signal is issued for notifying the user to replace the filtering mask with a new one.

A further object of the present invention provides an air-filtering protection device combined with an actuating and sensing device for monitoring the environment. The actuating and sensing device can be detached from the filtering mask to become an independent device, which can serve as a portable air quality monitoring device. Namely, the actuating and sensing device can monitor the air quality outside the filtering mask and transmit output data, which is generated by processing the monitored data, to a connection device. The information carried by the output data is displayed, stored and transmitted by the connection device. Consequently, the purpose of immediately displaying the air quality information fetched from the output data and immediately notifying the user are achieved. Moreover, the output data can be transmitted to a cloud server, and the cloud server constructs a cloud database after collecting the output data for providing real-time air quality information. According to the real-time air quality information provided by the cloud server, an air quality notification mechanism and an air quality processing mechanism are enabled. Therefore, the user can wear the air-filtering protection device immediately to prevent from the influence on human health caused by the air pollution.

In accordance with an aspect of the present disclosure, an air-filtering protection device is provided. The air-filtering protection device includes a filtering mask and an actuating and sensing device. The filtering mask is attached on a user's nose for filtering air and comprises a first coupling element. The actuating and sensing device comprises a second coupling element. The second coupling element is engaged with the first coupling element of the filtering mask for allowing the actuating and sensing device to be detachably mounted on the filtering mask. The actuating and sensing device comprises at least one senor, at least one actuating device, a microprocessor, a power controller and a data transceiver. The at least one actuating device is disposed on one side of the at least one sensor and comprises at least one guiding channel. The at least one actuating device is enabled to transport air to flow toward the at least one sensor through the at least one guiding channel so as to make the air sensed by the at least one sensor.

The above contents of the present disclosure will become more readily apparent to those ordinarily skilled in the art after reviewing the following detailed description and accompanying drawings, in which:

BRIEF DESCRIPTION OF THE DRAWINGS

FIG. 5 is a schematic cross-sectional view illustrating the fluid actuating device as shown in FIGS. 3A and 3B;

FIGS. 6A to 6E schematically illustrate the actions of the fluid actuating device according to the embodiment of the present disclosure.

DETAILED DESCRIPTION OF THE PREFERRED EMBODIMENT

Figure 1A:
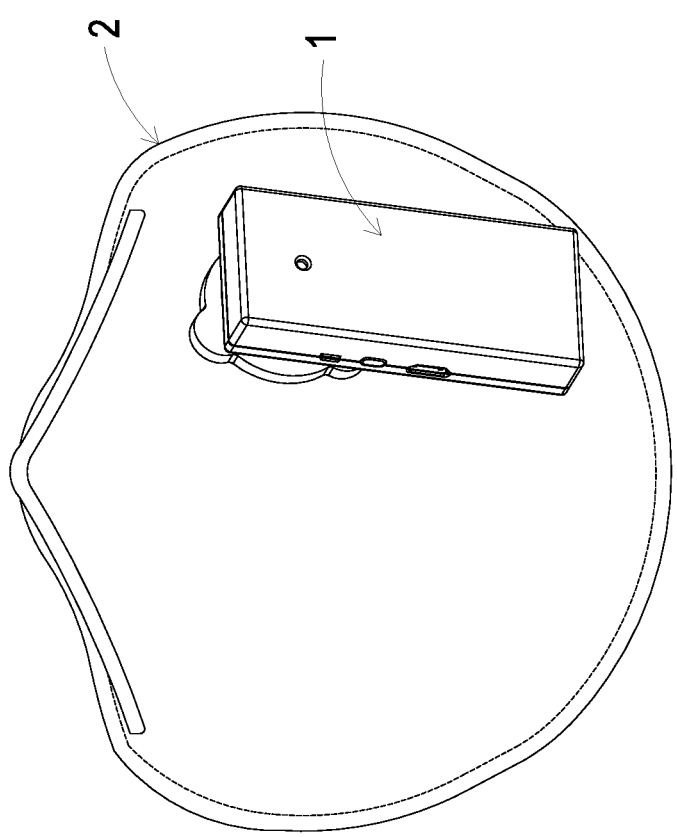
FIG. 1A is a schematic perspective view illustrating the outer appearance of an air-filtering protection device according to an embodiment of the present disclosure.

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIG. 1. The present discourse provides an air-filtering protection device including at least one filtering mask 2, at least one first coupling element 21, at least one actuating and sensing device 1, at least one second coupling element 10, at least one sensor 12, at least one actuating device 13, at least one microprocessor 14, at least one power controller 15, at least one data transceiver 16, at least one guiding channel 17 and at least one air. The number of the filtering mask 2, the first coupling element 21, the actuating and sensing device 1, the second coupling element 10, the sensor 12, the actuating device 13, the microprocessor 14, the power controller 15, the data transceiver 16, the guiding channel 17 and the air is exemplified by one for each in the following embodiments but not limited thereto. It is noted that each of the filtering mask 2, the first coupling element 21, the actuating and sensing device 1, the second coupling element 10, the sensor 12, the actuating device 13, the microprocessor 14, the power controller 15, the data transceiver 16, the guiding channel 17 and the air can also be provided in plural numbers.

Figure 1B:
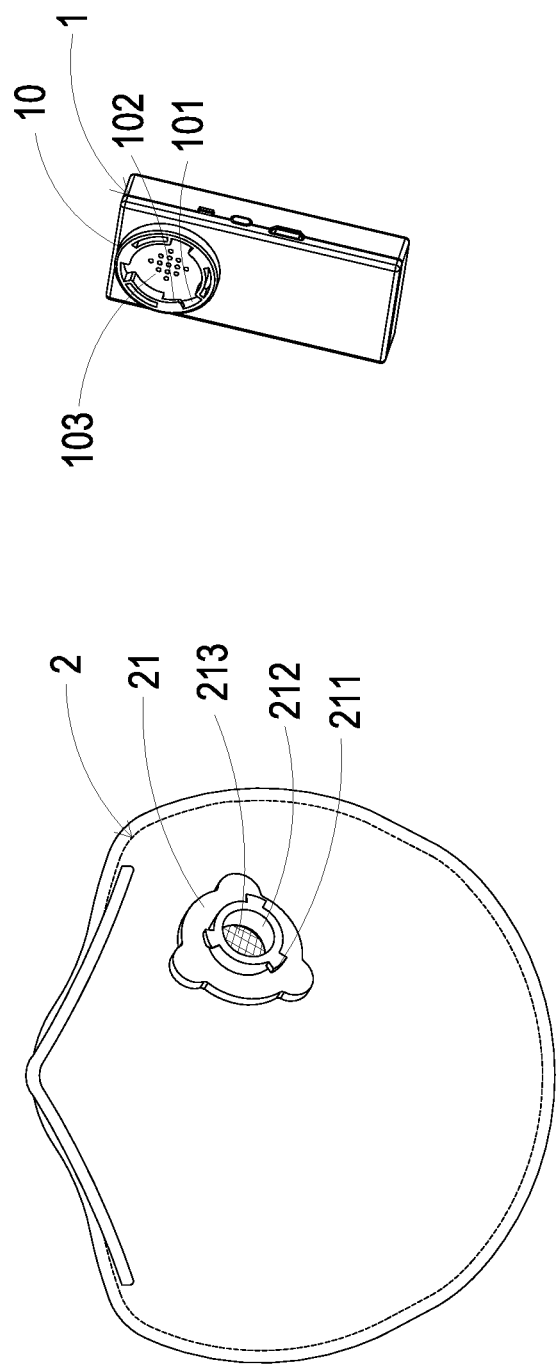
FIG. 1B is a schematic partial exploded view illustrating the air-filtering protection device of FIG. 1A.
Figure 1C:
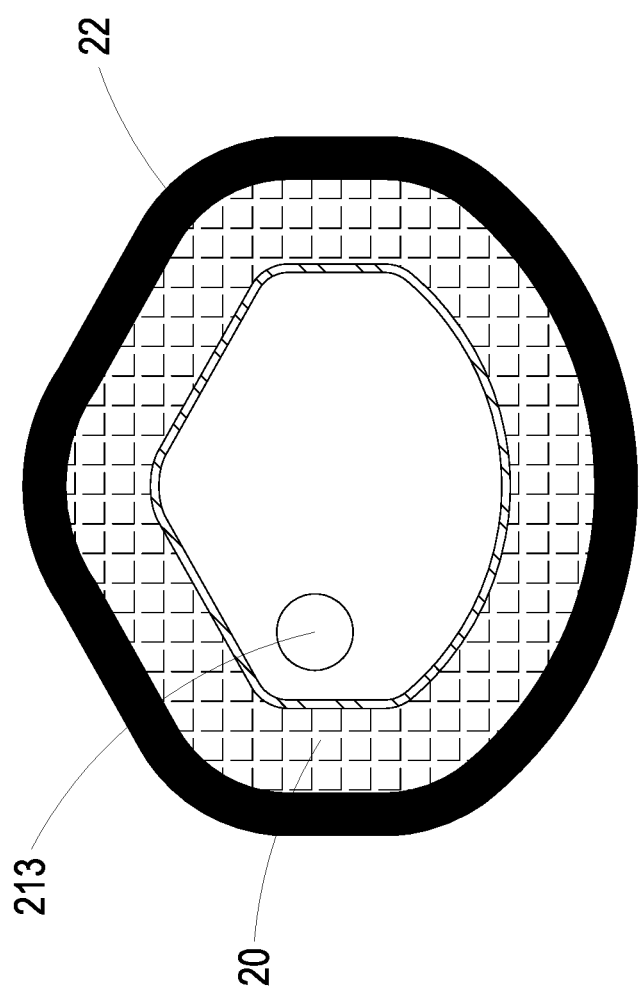
FIG. 1C is a schematic perspective view illustrating the inner structure of the air-filtering protection device of FIG. 1A.

Please refer to FIGS. 1A, 1B and 1C. The air-filtering protection device of the present disclosure includes a filtering mask 2 and an actuating and sensing device 1. The filtering mask 2 is provided to be adhered to and attached on a user's nose for filtering air. The filtering mask 2 has a surface 20 made of a filter material. Moreover, the filtering mask 2 includes a sealing frame 22 provided to be adhered to the user continuously. The sealing frame 22 may be a soft and flexible member or an air bag, the form of which is adjustable with a contact area between the sealing frame 22 and another object in contact therewith. Therefore, when the user wears the filtering mask 2, the filtering mask 2 is adhered to and positioned on the user's nose since the sealing frame 22 tightly fit the user's facial skin. At this moment, the air inhaled by the user is filtered through the filter material of the surface 20. The filtering mask 2 may be a mouth mask, or a face mask (not shown) having a filter element sandwiched between an inner surface and an outer surface thereof. As so, the air inhaled by the user can be filtered through the filter element while passing through this filter element.

Moreover, the filtering mask 2 includes a first coupling element 21. The first coupling element 21 may be a fastening element having one or more tenons 211. The first coupling element 21 has a first air channel 212 running through the inner surface and the outer surface of the filtering mask 2. A filtering element 213 is disposed in the first air channel 212 to seal the first air channel 212 so as to filter the air passing therethrough. Consequently, when the filtering mask 2 is worn by the user, it covers the mouth and nose of the user completely for achieving the function of filtering air. In addition, the actuating and sensing device 1 includes a second coupling element 10. The second coupling element 10 may be a fastening element with one or more recesses 101 and one or more engaging slots 102. The recess 101 is in communication with the engaging slot 102. The second coupling element 10 includes a second air channel 103 in fluid communication with the interior of the actuating and sensing device 1 for allowing the air to be introduced into the interior of the actuating and sensing device 1.

For mounting and positioning the actuating and sensing device 1 on the filtering mask 2, the tenons 211 of the first coupling element 21 are in alignment with the corresponding recess 101 of the second coupling element 10 and insert therein, after which the first coupling element 21 and the second coupling element 10 are rotated with respect to each other along a locking direction, such that the tenons 212 of the first coupling element 21 are snap-fitted into the corresponding engaging slots 102 of the second coupling element 10. Consequently, the actuating and sensing device 1 is mounted and positioned on the filtering mask 2. Namely, the actuating and sensing device 1 is engaged with the filtering mask 2 through the snap-fit connections of the tenons 211 of the first coupling elements 21 and the corresponding engaging slots 102 of the second coupling element 10. On the contrary, after the first coupling element 21 and the second coupling element 10 are rotated with respect to each other along an unlocking direction, and the tenons 211 of the first coupling elements 21 are made in alignment with the corresponding the recesses 101 of the second coupling element 10, the tenons 211 are easily detached from the snap-fit connections with the engaging slots 102, such that the second coupling element 10 is disengaged from the first coupling element 11.

Consequently, the actuating and sensing device 1 is disassembled from the filtering mask 2 and becomes an independent device which can serve as a portable air-quality-monitoring device.

Figure 7:
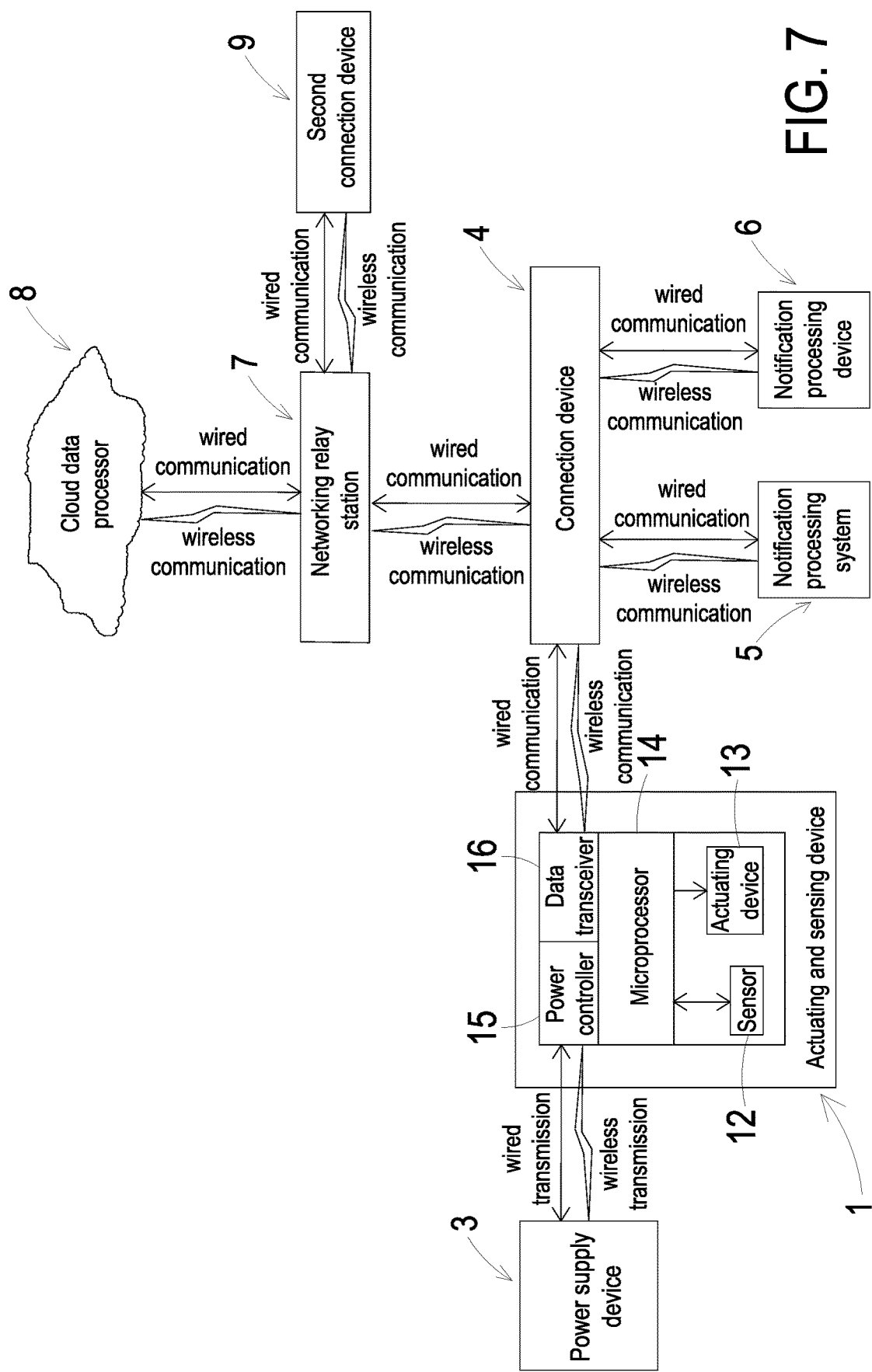
FIG. 7 schematically illustrates the architecture of a driving and information transmitting system for the actuating and sensing device according to an embodiment of the present disclosure.

Please refer to FIG. 7. The actuating and sensing device 1 includes at least one sensor 12, at least one actuating device 13, a microprocessor 14, a power controller 15 and a data transceiver 16. The power controller 15 receives energy and transfers the energy to the sensor 12 and the actuating device 13 to enable the sensor 12 and the actuating device 13. The data transceiver 16 receives and transmits data.

An example of the sensor 12 includes but is not limited to a temperature sensor, a volatile organic compound sensor (e.g., a sensor for measuring formaldehyde or ammonia gas), a particulate sensor (e.g., a PM2.5 particle sensor), a carbon monoxide sensor, a carbon dioxide sensor, an oxygen sensor, an ozone sensor, any other appropriate gas sensor, a humidity sensor, a water content sensor, a substance sensor (e.g., a sensor for measuring compounds or biological substances in liquid or air), a water quality sensor, any other appropriate liquid sensor, a light sensor, or the combination thereof. Alternatively, the sensor 12 includes but is not limited to a virus sensor, a bacterial sensor, a microbiological sensor or the combination thereof.

The actuating device 13 is a driving device capable of driving a controlled system in response to a control signal. An example of the actuating device 13 includes but is not limited to an electric actuating device, a magnetic actuating device, a thermal actuating device, a piezoelectric actuating device, a fluid actuating device or the combination thereof. For example, the electric actuating device is a DC motor, an AC motor or a step motor. For example, the magnetic actuating device is a magnetic coil motor, the thermal actuating device is a heat pump, the piezoelectric actuating device is a piezoelectric pump, and the fluid actuating device is a gas pump or a liquid pump.

Please refer to FIGS. 2A, 2B, 2C and 2D. The sensor 12 and the actuating device 13 are integrated together to form a modular structure. The actuating device 13 is disposed on one side of the sensor 12. The actuating device 13 includes at least one guiding channel 17. When the actuating device 13 is enabled to transport the air, the air is transferred through the guiding channel 17 and flows toward the sensor 12. Consequently, the air is sensed by the sensor 12. Since the air is guided to the sensor 12 by the actuating device 13, the sensor 12 is provided with the amount of the air with stability and uniformity continuously, so that the time of the sensor 12 in response to the air is largely reduced and the air is monitored with precision.

Please refer to FIGS. 2A, 2B, 2C and 2D. The actuating and sensing device 1 further includes a carrier 11, which is a platform for integrating the sensor 12 with the actuating device 13. The carrier 11 may be a substrate such as a printed circuit board (PCB) for disposing an array composed of the sensor 12 and the actuating device 13 thereon. In some other embodiments, the carrier 11 may be an application-specific integrated circuit (ASIC) or a system on chip (SOC). The sensor 12 is deposited on the carrier 11, and the actuating device 13 can be packaged on the carrier 11. It is noted that the carrier 11 is not limited to the above-mentioned embodiments and may be other platform for integrating the sensor 12 and the actuating device 13.

In an embodiment, the actuating device 13 is a fluid actuating device. Preferably but not exclusively, the fluid actuating device 13 may be a piezoelectric pump or a micro-electro-mechanical system (MEMS) pump. In the following description, the actuating device 13 is exemplified by and referred to as the fluid actuating device 13 for being detailed illustrated. Hereinafter, the actions of the fluid actuating device 13 of a piezoelectric pump will be described as follows.

Figure 3A:
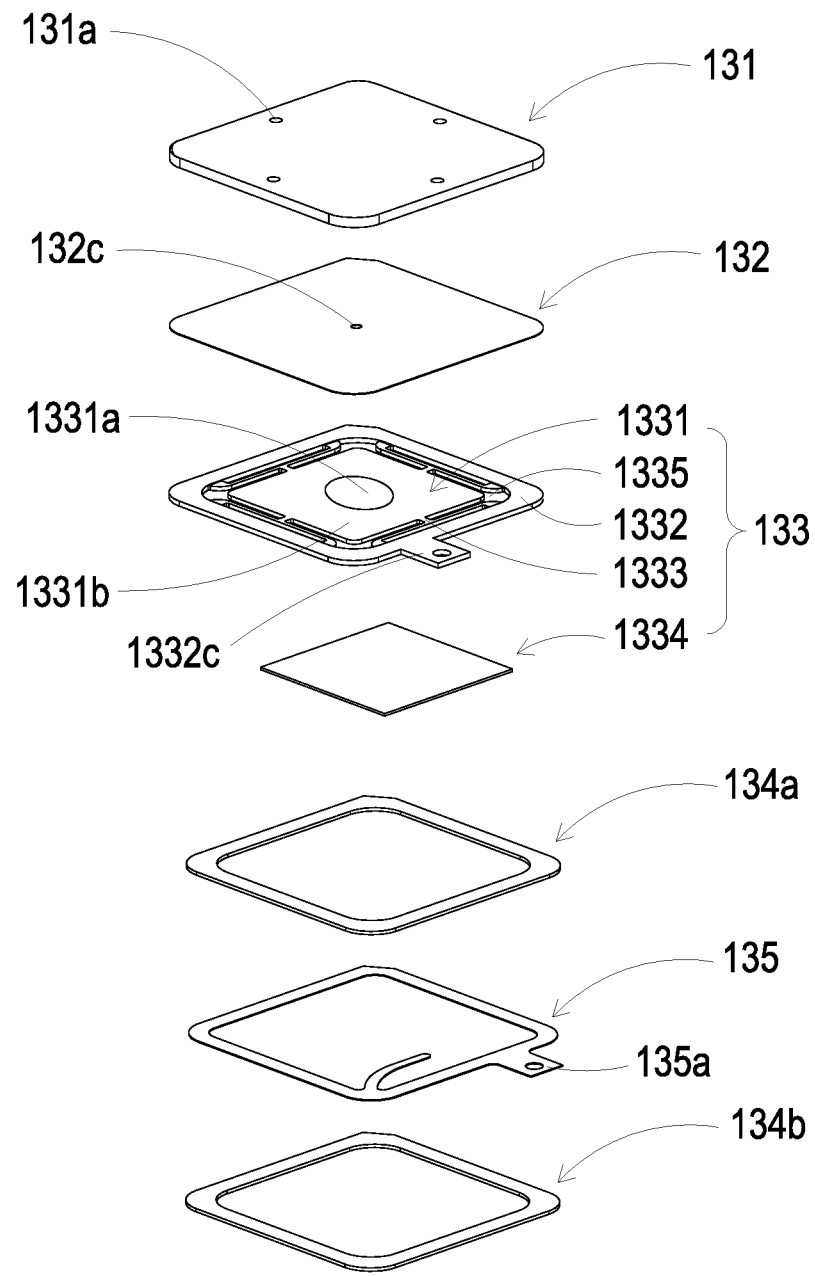
FIG. 3A is a schematic exploded view illustrating a fluid actuating device of the present disclosure.
Figure 3B:
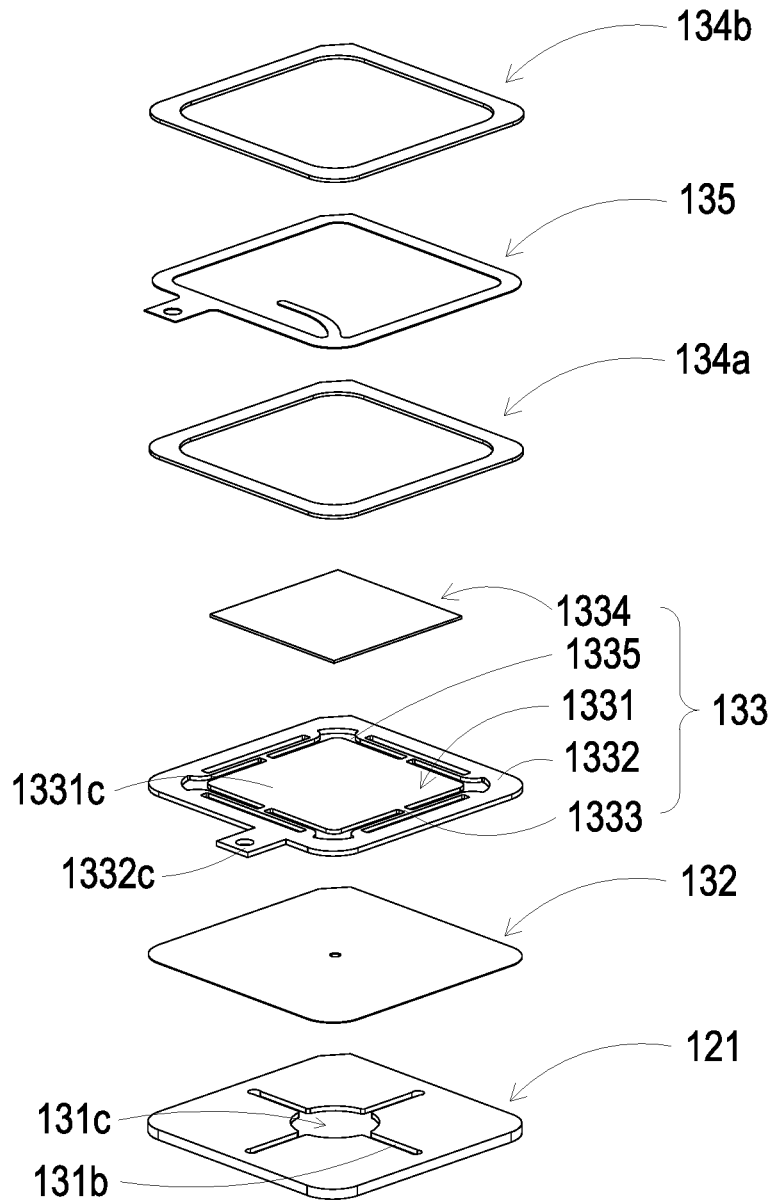
FIG. 3B is a schematic exploded view illustrating the fluid actuating device of FIG. 3A and taken along another viewpoint.

Please refer to FIGS. 3A and 3B. The fluid actuating device 13 includes a gas inlet plate 131, a resonance plate 132, a piezoelectric actuator 133, a first insulation plate 134a, a conducting plate 135 and a second insulation plate 134b. The piezoelectric actuator 133 is aligned with the resonance plate 132. The gas inlet plate 131, the resonance plate 132, the piezoelectric actuator 133, the first insulation plate 134a, the conducting plate 135 and the second insulation plate 134b are stacked on each other sequentially. After the above-mentioned components are combined together, the cross-sectional view of the resulting structure of the fluid actuating device 13 is shown in FIG. 5.

The gas inlet plate 131 includes at least one inlet 131a. Preferably but not exclusively, the gas inlet plate 131 includes four inlets 131a. The inlets 131a run through the gas inlet plate 131. In response to the action of the atmospheric pressure, the air can be introduced into the fluid actuating device 13 through the at least one inlet 131a. Moreover, at least one convergence channel 131b is formed on a first surface of the gas inlet plate 131, and is in communication with the at least one inlet 131a on a second surface of the gas inlet plate 131. Moreover, a central cavity 131c is located at the intersection of the convergence channels 131b. The central cavity 131c is in communication with the at least one convergence channel 131b such that the air from the at least one inlet 131a would be introduced into the at least one convergence channel 131b and is guided to the central cavity 131c. In this embodiment, the at least one inlet 131a, the at least one convergence channel 131b and the central cavity 131c of the gas inlet plate 131 are integrally formed in one piece. The central cavity 131c forms a convergence chamber for temporarily storing the air. In some embodiments, the gas inlet plate 131 may be, for example, made of stainless steel. Moreover, the depth of the convergence chamber defined by the central cavity 131c may be equal to the depth of the at least one convergence channel 131b. The resonance plate 132 is made of a flexible material. The resonance plate 132 has a central aperture 132c formed corresponding to the central cavity 131c of the gas inlet plate 131 which allows the air to be transferred therethrough. In other embodiments, the resonance plate 132 may be, for example, made of copper.

The piezoelectric actuator 133 includes a suspension plate 1331, an outer frame 1332, at least one bracket 1333 and a piezoelectric plate 1334. The piezoelectric plate 1334 is attached on a first surface 1331c of the suspension plate 1331. In response to an applied voltage, the piezoelectric plate 1334 is subjected to a deformation. When the piezoelectric plate 1334 is subjected to the deformation, it facilitates a bending vibration of the suspension plate 1331. In this embodiment, the at least one bracket 1333 is connected between the suspension plate 1331 and the outer frame 1332, while the two ends of the bracket 1333 are connected with the outer frame 1332 and the suspension plate 1331 respectively so that the bracket 1333 can elastically support the suspension plate 1331. At least one vacant space 1335 is formed between the bracket 1333, the suspension plate 1331 and the outer frame 1332. The at least one vacant space 1335 is in communication with the guiding channel 17 for allowing the air to go through. The type of the suspension plate 1331 and the outer frame 1332 and the type and the number of the at least one bracket 1333 may be varied according to the practical requirements. The outer frame 1332 is arranged around the suspension plate 1331. Moreover, a conducting pin 1332c is protruded outwardly from the outer frame 1332 so as to be electrically connected with an external circuit (not shown).

Figure 4:
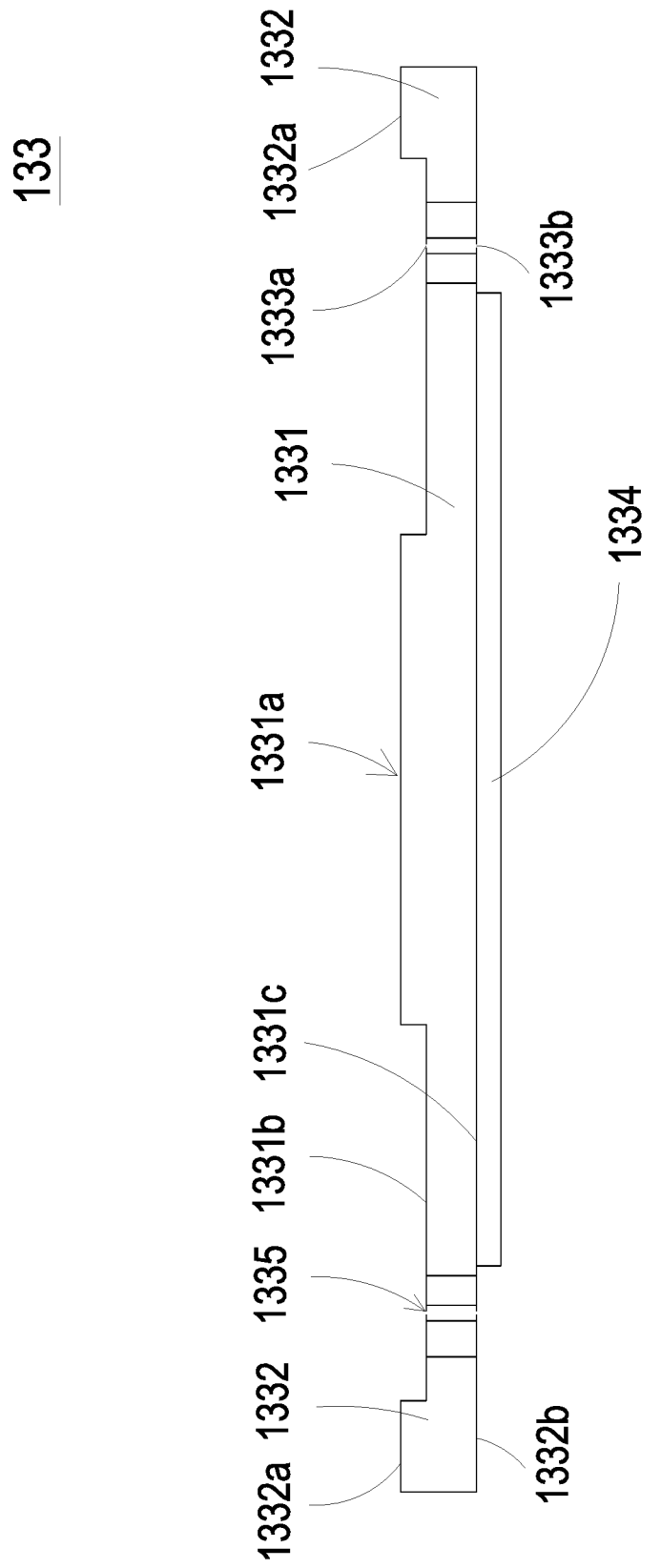
FIG. 4 is a schematic cross-sectional view illustrating the piezoelectric actuator of the fluid actuating device as shown in FIGS. 3A and 3B.

As shown in FIG. 4, the suspension plate 1331 has a bulge 1331a that makes the suspension plate 1331 a stepped structure. The bulge 1331a is formed on a second surface 1331b of the suspension plate 1331. The bulge 1331a may be a circular convex structure. A top surface of the bulge 1331a of the suspension plate 1331 is coplanar with a second surface 1332a of the outer frame 1332, while the second surface 1331b of the suspension plate 1331 is coplanar with a second surface 1333a of the bracket 1333. Moreover, there is a specific depth from the bulge 1331a of the suspension plate 1331 (or the second surface 1332a of the outer frame 1332) to the second surface 1331b of the suspension plate 1331 (or the second surface 1333a of the bracket 1333). A first surface 1331c of the suspension plate 1331, a first surface 1332b of the outer frame 1332 and a first surface 1333b of the bracket 1333 are coplanar with each other. The piezoelectric plate 1334 is attached on the first surface 1331c of the suspension plate 1331. In some other embodiments, the suspension plate 1331 may be a square plate structure with two flat surfaces, but the type of the suspension plate 1331 may be varied according to the practical requirements. In this embodiment, the suspension plate 1331, the at least one bracket 1333 and the outer frame 1332 may be integrally formed from a metal plate (e.g., a stainless steel plate). In an embodiment, the length of a side of the piezoelectric plate 1334 is smaller than the length of a side of the suspension plate 1331. In some embodiments, the length of a side of the piezoelectric plate 1334 is equal to the length of a side of the suspension plate 1331. Similarly, the piezoelectric plate 1334 is a square plate structure to have the same shape as the suspension plate 1331 in terms of the design.

In this embodiment, the first insulation plate 134a, the conducting plate 135 and the second insulation plate 134b of the fluid actuating device 13 are stacked on each other sequentially and located under the piezoelectric actuator 133, as shown in FIG. 3A. The profiles of the first insulation plate 134a, the conducting plate 135 and the second insulation plate 134b substantially match the profile of the outer frame 1332 of the piezoelectric actuator 133. In some embodiment, the first insulation plate 134a and the second insulation plate 134b may be made of an insulating material (e.g. a plastic material) for providing insulating efficacy. In other embodiment, the conducting plate 135 may be made of an electrically conductive material (e.g. a metallic material) for providing electrically conducting efficacy. In this embodiment, the conducting plate 135 may have a conducting pin 135a disposed thereon so as to be electrically connected with an external circuit (not shown).

Please refer to FIG. 5. In an embodiment, the gas inlet plate 131, the resonance plate 132, the piezoelectric actuator 133, the first insulation plate 134a, the conducting plate 135 and the second insulation plate 134b of the fluid actuating device 13 are stacked on each other sequentially. Moreover, there is a gap h between the resonance plate 132 and the outer frame 1332 of the piezoelectric actuator 133. In this embodiment, the gap h between the resonance plate 132 and the outer frame 1332 of the piezoelectric actuator 133 may be filled with a filler (e.g. a conductive adhesive) so that a depth from the resonance plate 132 to the bulge 1331a of the suspension plate 1331 of the piezoelectric actuator 133 can be maintained. The gap h ensures the proper distance between the resonance plate 132 and the bulge 1331a of the suspension plate 1331 of the piezoelectric actuator 133, so that the air can be transferred quickly, the contact interference is reduced and the generated noise is largely reduced. In some embodiments, alternatively, the height of the outer frame 1332 of the piezoelectric actuator 133 is increased, so that a gap is formed between the resonance plate 132 and the piezoelectric actuator 133.

Please refer to FIGS. 2C, 2D, 3A, 3B and 5. After the gas inlet plate 131, the resonance plate 132 and the piezoelectric actuator 133 are combined together, a movable part 132a and a fixed part 132b of the resonance plate 132 are defined, wherein the movable part 132a is located around the central aperture 132c. A convergence chamber for converging the air is defined by the movable part 132a of the resonance plate 132 and the gas inlet plate 131 collaboratively. Moreover, a first chamber 130 is formed between the resonance plate 132 and the piezoelectric actuator 133 for temporarily storing the air. Through the central aperture 132c of the resonance plate 132, the first chamber 130 is in communication with the central cavity 131c of the gas inlet plate 131. The peripheral regions of the first chamber 130 are in communication with the guiding channel 17 through the vacant space 1335 between the brackets 1333 of the piezoelectric actuator 133.

FIGS. 6A to 6E schematically illustrate the actions of the fluid actuating device of the actuating and sensing device according to the embodiment of the present disclosure. Please refer to FIGS. 2C, 2D, 3A, 3B, 5 and FIGS. 6A to 6E. The actions of the fluid actuating device 13 will be described as follows. When the fluid actuating device 13 is enabled, the piezoelectric actuator 133 vibrates along a vertical direction in a reciprocating manner by using the bracket 1333 as a fulcrum. The piezoelectric actuator 133 vibrates downwardly in response to the applied voltage. Since the resonance plate 132 is light and thin, the resonance plate 132 vibrates along the vertical direction in the reciprocating manner in resonance with the piezoelectric actuator 133. More especially, a region of the resonance plate 132 spatially corresponding to the central cavity 131c of the gas inlet plate 131 is also subjected to a bending deformation. The region of the resonance plate 132 corresponding to the central cavity 131c of the gas inlet plate 131 is the movable part 132a of the resonance plate 132. When the piezoelectric actuator 133 deforms downwardly during vibration, the movable part 132a of the resonance plate 132 is subjected to the bending deformation because the movable part 132a of the resonance plate 132 is pushed by the air and vibrates in response to the piezoelectric actuator 133. In response to the downward deformation of the piezoelectric actuator 133 during vibration, the air is fed into the at least one inlet 131a of the gas inlet plate 131. Then, the air is transferred to the central cavity 131c of the gas inlet plate 131 through the at least one convergence channel 131b. Then, the air is transferred through the central aperture 132c of the resonance plate 132 spatially corresponding to the central cavity 131c, and introduced downwardly into the first chamber 130. As the piezoelectric actuator 133 is enabled, the resonance of the resonance plate 132 occurs. Consequently, the resonance plate 132 vibrates along the vertical direction in the reciprocating manner.

As shown in FIG. 6B, during the vibration of the movable part 132a of the resonance plate 132 at this stage, the movable part 132a of the resonance plate 132 moves down to contact and attach on the bulge 1331a of the suspension plate 1331 of the piezoelectric actuator 133, and a distance from the fixed part 132b of the resonance plate 132 to a region of the suspension plate 1331 except the bulge 1331a remains the same. Owing to the deformation of the resonance plate 132 described above, a middle communication space of the first chamber 130 is closed, and the volume of the first chamber 130 is compressed. Under this circumstance, the pressure gradient occurs to push the air in the first chamber 130 toward peripheral regions of the first chamber 130, and flowing downwardly through the vacant space 1335 of the piezoelectric actuator 133.

Referring to FIG. 6C, the movable part 132a of the resonance plate 132 returns to its original position when the piezoelectric actuator 133 deforms upwardly during vibration. Consequently, the volume of the first chamber 130 is continuously compressed to generate the pressure gradient which makes the air in the first chamber 130 continuously pushed toward peripheral regions. Meanwhile, the air is continuously fed into the at least one inlet 131a of the gas inlet plate 131, and transferred to the central cavity 131c.

Then, as shown in FIG. 6D, the resonance plate 132 moves upwardly, which is cause by the resonance of upward motion of the piezoelectric actuator 133. That is, the movable part 132a of the resonance plate 132 is also vibrated upwardly. Consequently, it decreases the current of the air from the at least one inlet 131a of the gas inlet plate 131 into the central cavity 131c.

At last, as shown in FIG. 6E, the movable part 132a of the resonance plate 132 has returned to its original position. As the embodiments described above, when the resonance plate 132 vibrates along the vertical direction in the reciprocating manner, the gap h between the resonance plate 132 and the piezoelectric actuator 133 is helpful to increase the maximum displacement along the vertical direction during the vibration. In other words, the configuration of the gap h between the resonance plate 132 and the piezoelectric actuator 133 can increase the amplitude of vibration of the resonance plate 132. Consequently, a pressure gradient is generated in the guiding channel 17 of the fluid actuating device 13 to facilitate the air to flow at a high speed. Moreover, since there is an impedance difference between the feeding direction and the exiting direction, the air can be transmitted from the inlet side to the outlet side. Even if a gas pressure (which may impede the air flow) exist at the outlet side, the fluid actuating device 13 still has the capability of pushing the air to the guiding channel 17 while achieving the silent efficacy.

The steps of FIGS. 6A to 6E may be done repeatedly. Consequently, air circulation is generated in which the ambient air is transferred from the outside to the inside by the fluid actuating device 13.

Figure 2A:
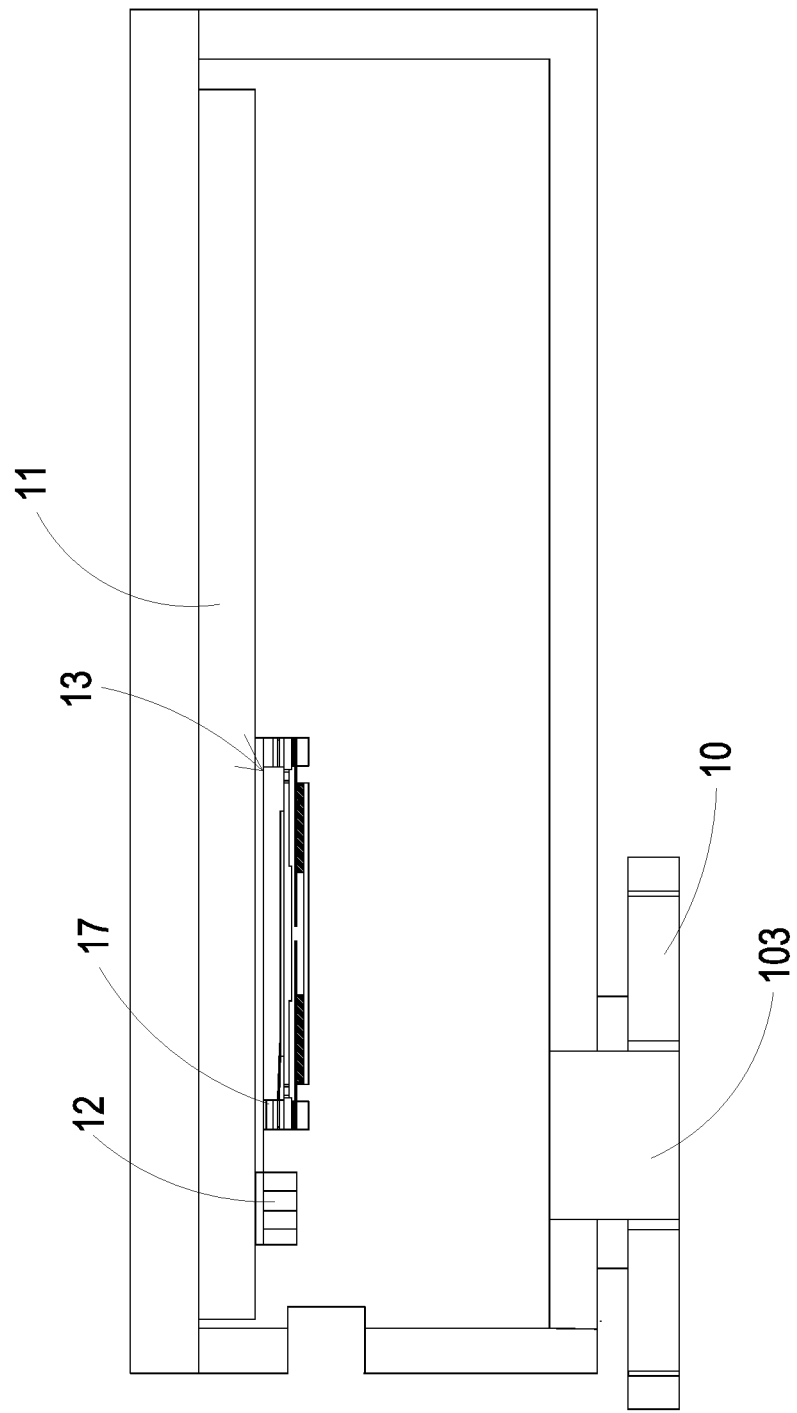
FIG. 2A is a schematic cross-sectional view illustrating the actuating and sensing device of the air-filtering protection device of FIG. 1A.
Figure 2B:
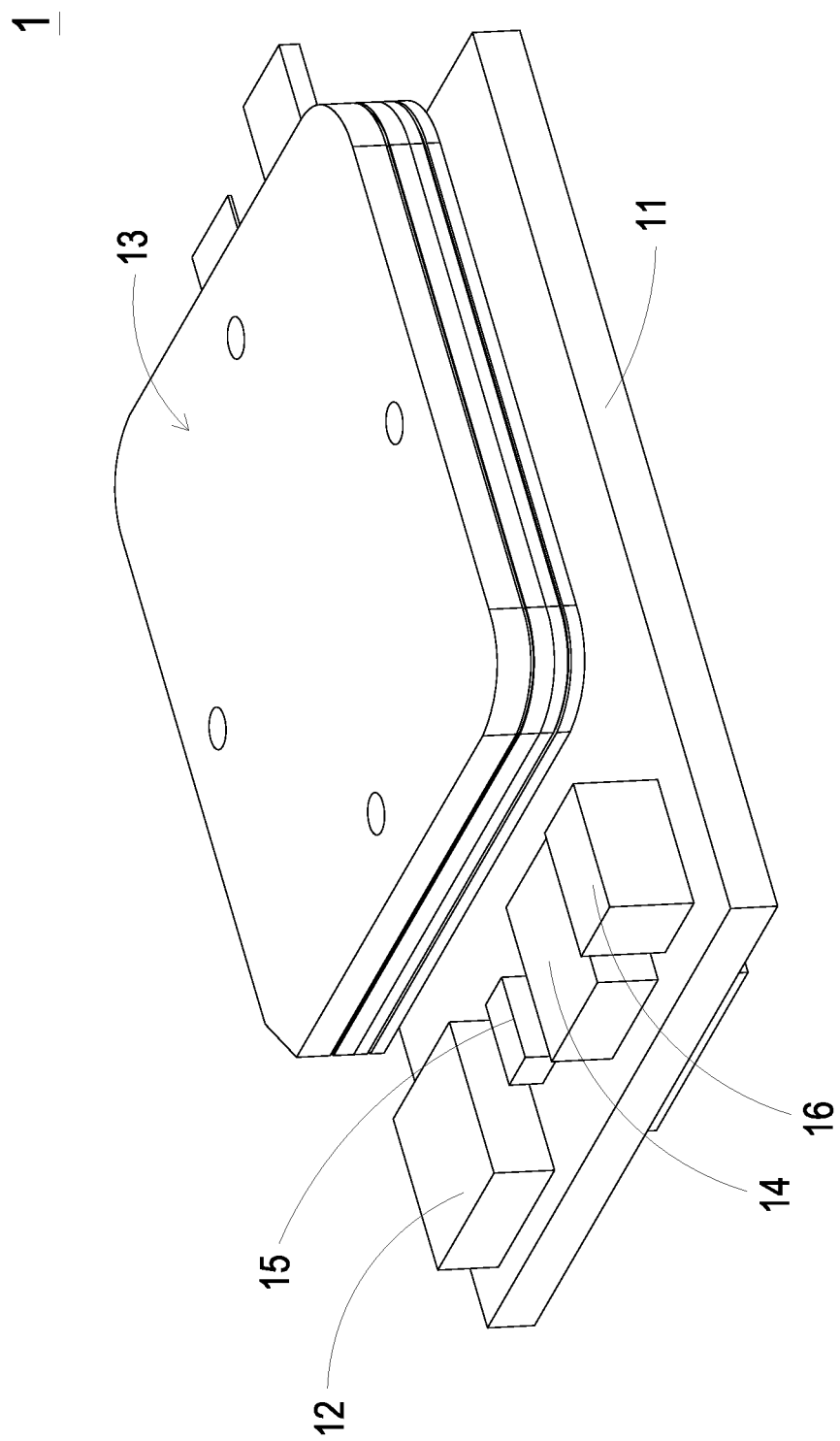
FIG. 2B is a schematic perspective view illustrating the outer appearance of the actuating and sensing device of the air-filtering protection device of FIG. 2A.
Figure 2C:
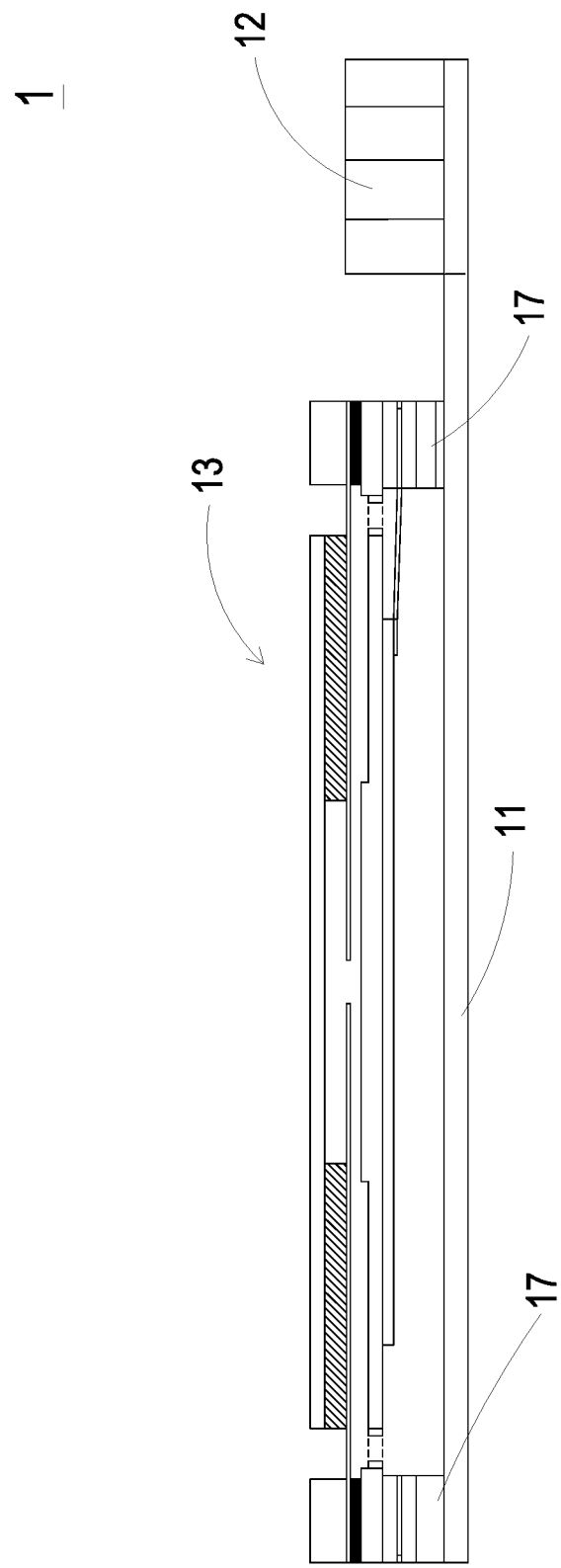
FIG. 2C is an enlarged cross-sectional view illustrating the actuating and sensing device of the air filtering protection device of FIG. 2A.
Figure 2D:
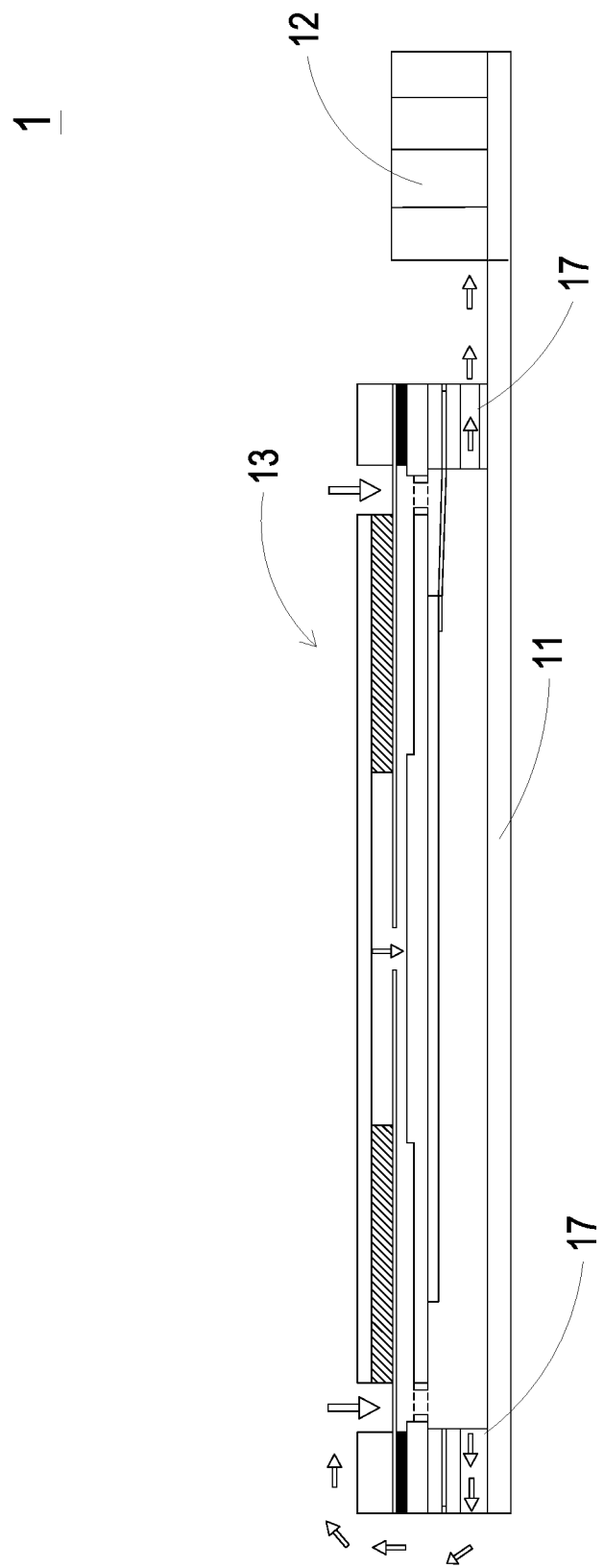
FIG. 2D is a schematic cross-sectional view illustrating the actions of the fluid actuating device of the actuating and sensing device according to the embodiment of the present disclosure.

As mentioned above, the actions of the fluid actuating device 13 is further described as below. The gas inlet plate 131, the resonance plate 132, the piezoelectric actuator 133, the first insulation plate 134a, the conducting plate 135 and the second insulation plate 134b are sequentially stacked. As shown in FIGS. 2C and 2D, the fluid actuating device 13 is disposed on the carrier 11 and the guiding channel 17 is formed between the fluid actuating device 13 and the carrier 11. The guiding channel 17 is disposed on one side of the sensor 12. The fluid actuating device 13 is enabled to compress the air, such that the air is exhausted through the guiding channel 17 along the direction indicated by the arrow (see FIG. 2D), by which the air is directly guided to the sensor 12 at a stable flowrate. Consequently, the sensor 12 can monitor the air directly and acquire the accurate sensing results. Moreover, the response time of the sensor 12 is reduced and the air is precisely monitored.

FIG. 7 schematically illustrates the architecture of a driving and information transmitting system for the actuating and sensing device according to an embodiment of the present disclosure. Please refer to FIG. 7. The power controller 15 of the actuating and sensing device 1 is used to store and output energy. The power controller 15 transfers the energy to the sensor 12 and the actuating device 13 so as to enable the sensor 12 to perform a sensing operation and the actuating device 13 to perform an actuating operation under control. The actuating and sensing device 1 is not necessarily equipped with a power source since it is in connection with a power supply device 3, in which the power supply device 3 transfers energy to power the sensor 12 and the actuating device 13. Since the installation space of the overall modular structure is saved, the purpose of minimizing the modular structure is achieved.

As mentioned above, the power controller 15 transfers the energy to power the sensor 12 and the actuating device 13 through the power supply device 3. In an embodiment, the power supply device 3 transfers the energy to the power controller 15 in a wired transmission manner. For example, the power supply device 3 is a charger or a rechargeable battery capable of transferring the energy to the power controller 15 in the wired transmission manner. In another embodiment, the power supply device 3 transfers the energy to the power controller 15 in a wireless transmission manner. For example, the power supply device 3 is a charger or a chargeable battery equipped with a wireless charging component (or an induction charging component) for transferring the energy to the power controller 15 in the wireless transmission manner. In further another embodiment, the power supply device 3 is a portable mobile device with wireless charging/discharging capability, e.g., a smart phone having a wireless charging component (or an inductive charging component), and the smart phone transfers the energy to the power controller 15 in the wireless transmission manner.

In an embodiment, the power controller 15 further includes a chargeable element (not shown) for receiving and storing the energy. The chargeable element of the power controller 15 receives the energy from the power supply device 3 transferred through a wired transmission path or a wireless transmission path. Then, the chargeable element stores the energy, and outputs the energy is transferred to the sensor 12 and the actuating device 13 for powering the sensor 12 to perform a sensing operation and powering the actuating device 13.

The microprocessor 14 processes and calculates the monitored data to convert the monitored data to output data. The data transceiver 16 receives the output data, and sends it to the connection device 4 through transmission, so that the connection device 4 can display and store the information carried by the output data, or can transmit the information carried by the output data to a storage device (not shown) of the connection device 4 for storing or processing. In an embodiment, the connection device 4 is in communication with a notification processing system 5 to actively (i.e. directly notify) or passively (i.e. operated by a user to whom the information carried by the output data is provided) enable an air quality notification mechanism, e.g., an instant air quality map informs people to avoid away or to wear masks. In another embodiment, the connection device 4 is in communication with a notification processing device 6 to actively (i.e. directly operate) or passively (i.e. operated by a user to whom the information carried by the output data is provided) enable an air quality processing mechanism, e.g., an air cleaner or an air-conditioner is enabled to clean the air.

In an embodiment, the connection device 4 is a display device with a wired communication module (e.g., a desktop computer). In another embodiment, the connection device 4 is a display device with a wireless communication module (e.g., a notebook computer). In another embodiment, the connection device 4 is a portable electronic device with a wireless communication module (e.g., a mobile phone). For example, the wired communication module has an RS485 communication port, an RS232 communication port, a Modbus communication port or a KNX communication port, and the wireless communication module performs a wireless communication process according to a Zigbee communication technology, a Z-wave communication technology, an RF communication technology, a Bluetooth communication technology, a Wifi communication technology or an EnOcean communication technology.

A driving and information transmitting system for the actuating and sensing device 1 includes a networking relay station 7 and a cloud data processor 8. The connection device 4 sends the information carried by the output data to the networking relay station 7, after which the networking relay station 7 sends the information carried by the output data to the cloud data processor 8 to make it stored in and processed by the cloud data processor 8. The cloud data processor 8 processes the information carried by the output data to correspondingly issue a notification signal to the connection device 4 through the networking relay station 7. After the connection device 4 receives the notification signal, the notification processing system 5 connected with the connection device 4 receives the notification signal from the connection device 4, and accordingly enables an air quality notification mechanism. Alternatively, the notification processing device 6 connected with the connection device 4 receives the notification signal from the connection device 4, and accordingly enables an air quality processing mechanism.

In an embodiment, the connection device 4 issues a control command to the actuating and sensing device 1 so as to control the operation of the actuating and sensing device 1. Similarly, the control command is transmitted to the data transceiver 16 in the wired or wireless communication transmission manner as discussed above. Then, the control command is transmitted to the microprocessor 14 to control the sensor 12 to perform the sensing operation and enable the actuating device 13.

In an embodiment, the driving and information transmitting system for the actuating and sensing device 1 further includes a second connection device 9. The second connection device 9 issues the control command to the cloud data processor 8 through the networking relay station 7, then the control command is transmitted from the cloud data processor 8 to the connection device 4 through the networking relay station 7. After receiving the control command, the connection device 4 issues the control command to the data transceiver 16 of the actuating and sensing device 1. Then, the control command is transmitted to the microprocessor 14. According to the control command, the microprocessor 14 controls the sensor 12 to perform the sensing operation and enables the actuating device 13. In an embodiment, the second connection device 9 is a device with a wired communication module. In other embodiment, the second connection device 9 is a device with a wireless communication module. In another embodiment, the second connection device 9 is a portable electronic device with a wireless communication module, but not limited thereto.

The actuating and sensing device 1 of the air-filtering protection device can be detached from the filtering mask 2 to become an independent device, which is serving as a portable air quality monitoring device to monitor the air quality of the external air outside the filtering mask 2. While the user is wearing the air-filtering protection device, the mouth and the nose of the user are covered by the filtering mask 2 and a closed space is formed therebetween. Since the actuating and sensing device 1 is mounted and positioned on the filtering mask 2, the air in the closed space is driven by the actuating device 13 to flow, by which the air is introduced from the closed space inside the filtering mask 2 into the actuating and sensing device 1 through the fluid communication between the first air channel 212 of the first coupling element 21 and the second air channel 103 of the second coupling element 10. Consequently, the circulation of the air in the closed space is achieved so as to improve the efficacy of discharging the polluted air from the closed space and adjusting the temperature and the humidity in the closed space. In addition, after the air flows from the closed space inside the filtering mask 2 into the interior of the actuating and sensing device 1, the air is monitored by the sensor 12. Thus, the air quality in the filtering mask 2 is monitored, and information including the level of pollution, humidity and temperature in the filtering mask 2, is provided. Moreover, an actuation speed of the actuating device 13 is adjustable according to the air quality in the filtering mask 2 (e.g., the level of pollution), so that the air in the filtering mask 2 can be discharged in different flow rates (e.g. discharged air volume) for regulating the air quality in the filtering mask 2 and maintaining a good air quality state inside the filtering mask 2 for the user. When the sensor 12 monitors that the air quality is poor and harmful to human beings continuously, a notification signal is issued to notify the user for replacing the filtering mask 2 with a new one. On the other hand, the actuating and sensing device 1 uses the data transceiver 16 to transmit the output data, which is generated by processing the monitored data, to the connection device 4. Thus, the information carried by the output data can be displayed, stored and transmitted by the connection device 4, for immediately displaying the air quality information fetched from the output data and immediately notifying the user. Moreover, the output data can be transmitted to a cloud server. The cloud server constructs a cloud database after collecting the output data for providing the real-time air quality information. According to the real-time air quality information provided by the cloud server, an air quality notification mechanism and an air quality processing mechanism are enabled. Therefore, the user can be notified instantly to wear the air-filtering protection device immediately to prevent from the influence on human health caused by the air pollution.

From the above descriptions, the present disclosure provides an air-filtering protection device combined with an actuating and sensing device. Since the actuating device can promote the air to flow, and can allow the air to be continuously guided to the sensor in the fixed amount with stability and uniformity, the time of the sensor in response to the air is largely reduced, thereby monitoring the air with precision. Another advantage of the present disclosure is that the actuating and sensing device is not equipped with a power source, and an additional power supply device is employed to transfer the energy to power the sensor and the actuating device. Since the installation space of the overall modular structure is saved, the purpose of minimizing the modular structure is achieved. Moreover, after the output data, which is generated by processing the monitored data, is received by the data transceiver, the output data is transmitted from the data transceiver to the connection device. The information carried by the output data is displayed, stored and transmitted by the connection device. Consequently, the purpose of immediately displaying the air quality information fetched from the output data, and immediately notifying the user in case of poor ambient air quality, are achieved. Moreover, the output data can be transmitted to a cloud server, and the cloud server constructs a cloud database after collecting the output data for providing real-time air quality information. According to the real-time air quality information provided by the cloud server, an air quality notification mechanism and an air quality processing mechanism are enabled. Therefore, the user is notified instantly in case of poor ambient air quality to wear the air-filtering protection device immediately to prevent from the influence on human health caused by the air pollution. In sum, the air-filtering protection device of the present disclosure has significant improvement in helping the user to prevent from harm caused by air pollution.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An air-filtering protection device, comprising:
    a filtering mask adapted to be adhered to a user's nose for filtering air and comprising a first coupling element, and the first coupling element has a first air channel running through an inner surface and an outer surface of the filtering mask, and a filtering element is disposed in the first air channel; and
    an actuating and sensing device comprising a second coupling element engaged with the first coupling element of the filtering mask for allowing the actuating and sensing device to be detachably mounted on the filtering mask, wherein the actuating and sensing device comprises at least one sensor, at least one piezoelectric pump, a microprocessor, a power controller and a data transceiver, wherein the at least one piezoelectric pump is disposed on one side of the at least one sensor and comprises at least one guiding channel, the at least one piezoelectric pump is enabled to transport air to flow toward the at least one sensor through the at least one guiding channel so as to make the air sensed by the at least one sensor;
    wherein the piezoelectric pump is enabled to transport the air in different flow rates in accordance with an air quality information when the actuating and sensing device is mounted on the filtering mask and the filtering mask is worn by a user, so as to adjust the air inside the filtering mask for maintaining the air quality;
    wherein the piezoelectric pump comprises:
        a gas inlet plate having at least one inlet, at least one convergence channel and a central cavity defining a convergence chamber, wherein the at least one inlet allows the air to flow in, and the at least one convergence channel is disposed corresponding to the at least one inlet and guides the air from the at least one inlet toward the convergence chamber defined by the central cavity;
        a resonance plate having a central aperture and a movable part, wherein the central aperture is aligned with the convergence chamber and the movable part surrounds the central aperture;
        a piezoelectric actuator aligned with the resonance plate;
        a first insulation plate;
        a conducting plate; and
        a second insulation plate;
    wherein a gap is formed between the resonance plate and the piezoelectric actuator to define a first chamber, so that the air from the at least one inlet of the gas inlet plate is converged to the central cavity along the at least one convergence channel and flows into the first chamber through the central aperture of the resonance plate when the piezoelectric actuator is enabled, whereby the air is further transferred through a resonance between the piezoelectric actuator and the movable part of the resonance plate.

2. The air-filtering protection device according to claim 1, wherein the filtering mask has a surface made of a filter material.

3. The air-filtering protection device according to claim 1, wherein the filtering mask has a sealing frame adapted to be adhered to the user.

4. The air-filtering protection device according to claim 3, wherein the sealing frame is a soft and flexible member, which is adjustable with a contact area.

5. The air-filtering protection device according to claim 3, wherein the sealing frame is an air bag, which is adjustable with a contact area.

6. The air-filtering protection device according to claim 1, wherein the filtering mask is a mouth mask or a face mask with a filtering element disposed between an inner surface and an outer surface thereof.

7. The air-filtering protection device according to claim 1, wherein the first coupling element of the filtering mask is a fastening element having at least one tenon.

8. The air-filtering protection device according to claim 7, wherein the second coupling element is a fastening element having at least one recess and at least one engaging slot.

9. The air-filtering protection device according to claim 1, wherein the piezoelectric pump is a micro-electro-mechanical system (MEMS) piezoelectric pump.

10. The air-filtering protection device according to claim 1, wherein the piezoelectric actuator comprises:
    a suspension plate in a square shape, having a first surface, a second surface and a bulge, wherein the suspension plate is permitted to undergo a bending vibration;
    an outer frame arranged around the suspension plate;
    at least one bracket connected between the suspension plate and the outer frame for elastically supporting the suspension plate; and
    a piezoelectric plate, wherein a length of a side of the piezoelectric plate is smaller than or equal to a length of a side of the suspension plate, and the piezoelectric plate is attached on the first surface of the suspension plate, wherein when a voltage is applied to the piezoelectric plate, the suspension plate is driven to undergo the bending vibration;
    wherein the piezoelectric pump further comprises a conducting plate, a first insulation plate and a second insulation plate, wherein the gas inlet plate, the resonance plate, the piezoelectric actuator, the first insulation plate, the conducting plate and the second insulation plate are sequentially stacked.

11. The air-filtering protection device according to claim 1, wherein the air quality information including the level of pollution, humidity and temperature of the air inside the filtering mask.

12. The air-filtering protection device according to claim 11, wherein the air quality information is the level of pollution of the air inside the filtering mask.

13. The air-filtering protection device according to claim 1, wherein the power controller of the actuating and sensing device comprises a charging element for storing and outputting energy for proving the energy to the sensor and the piezoelectric pump to perform a sensing operation and an actuating operation respectively.

14. The air-filtering protection device according to claim 13, wherein the charging element transfers the energy in a wired or wireless transmission manner.

15. The air-filtering protection device according to claim 1, wherein the microprocessor of the actuating and sensing device computes monitored data generated by the at least one sensor and converts the monitored data into output data, wherein the data transceiver receives the output data and transmits the output data to the connection device, such that information carried by the output data is displayed, stored and transmitted by the connection device.

16. The air-filtering protection device according to claim 15, wherein the connection device is connected with a notification processing system to enable an air quality notification mechanism.

17. The air-filtering protection device according to claim 15, wherein the connection device is connected with a notification processing device to enable an air quality processing mechanism, so as to improve the air quality in the environment.

18. An air-filtering protection device, comprising:
   at least one filtering mask adapted to be adhered to a user's nose for filtering air and comprising at least one first coupling element, and the first coupling element has a first air channel running through an inner surface and an outer surface of the filtering mask, and a filtering element is disposed in the first air channel; and
   at least one actuating and sensing device comprising at least one second coupling element engaged with the first coupling element of the filtering mask for allowing the actuating and sensing device to be detachably mounted on the filtering mask, wherein the actuating and sensing device comprises at least one sensor, at least one piezoelectric pump, at least one microprocessor, at least one power controller and at least one data transceiver, wherein the at least one piezoelectric pump is disposed on one side of the at least one sensor and comprises at least one guiding channel, the at least one piezoelectric pump is enabled to transport air to flow toward the at least one sensor through the at least one guiding channel so as to make the air sensed by the at least one sensor;
   wherein the piezoelectric pump is enabled to transport the air in different flow rates in accordance with an air quality information when the actuating and sensing device is mounted on the filtering mask and the filtering mask is worn by a user, so as to adjust the air inside the filtering mask for maintaining the air quality;
   wherein the piezoelectric pump comprises:
      a gas inlet plate having at least one inlet, at least one convergence channel and a central cavity defining a convergence chamber, wherein the at least one inlet allows the air to flow in, and the at least one convergence channel is disposed corresponding to the at least one inlet and guides the air from the at least one inlet toward the convergence chamber defined by the central cavity;
      a resonance plate having a central aperture and a movable part, wherein the central aperture is aligned with the convergence chamber and the movable part surrounds the central aperture;
      a piezoelectric actuator aligned with the resonance plate;
      a first insulation plate;
      a conducting plate; and
      a second insulation plate;
   wherein a gap is formed between the resonance plate and the piezoelectric actuator to define a first chamber, so that the air from the at least one inlet of the gas inlet plate is converged to the central cavity along the at least one convergence channel and flows into the first chamber through the central aperture of the resonance plate when the piezoelectric actuator is enabled, whereby the air is further transferred through a resonance between the piezoelectric actuator and the movable part of the resonance plate.

* * * * *